United States Patent [19]

Delserro et al.

[11] 4,153,228
[45] May 8, 1979

[54] SELF-TIGHTENING CLAMP

[75] Inventors: Samuel Delserro, Easton, Pa.; Samuel B. Hsueh, Louisville, Ky.

[73] Assignee: General Electric Company, Louisville, Ky.

[21] Appl. No.: 838,607

[22] Filed: Oct. 3, 1977

[51] Int. Cl.$^2$ .............................................. F16L 3/12
[52] U.S. Cl. ................................ 248/74 PB; 24/19; 24/73 PB; 24/286
[58] Field of Search .............. 248/74 PB, 74 B, 74 R, 248/69; 24/16 R, 16 PB, 19, 25, 73 PB, 268, 280, 286, 281

[56] References Cited

U.S. PATENT DOCUMENTS

| | | | |
|---|---|---|---|
| 386,882 | 7/1888 | Hecox | 24/271 |
| 428,660 | 5/1890 | Yerdon | 24/279 |
| 863,992 | 8/1907 | Hiss | 248/69 |
| 1,219,882 | 3/1917 | Swaidmark | 24/280 |
| 1,383,058 | 6/1921 | Atkin | 24/281 |
| 2,283,179 | 5/1942 | Buckingham | 248/281 |
| 2,421,443 | 6/1947 | Torresen | 248/74 B |
| 2,998,217 | 8/1961 | Englis et al. | 248/74 B |
| 3,099,054 | 7/1963 | Spiro | 24/16 PB |
| 3,142,881 | 8/1964 | Johnston | 24/279 |
| 3,552,696 | 1/1971 | Orenick | 248/68 R |
| 3,979,093 | 9/1976 | Madden | 248/74 PB X |
| 3,995,795 | 12/1976 | Hogan | 248/74 PB X |

FOREIGN PATENT DOCUMENTS 835605 5/1960 United Kingdom .................. 248/74 R

*Primary Examiner*—Rodney H. Bonck
*Attorney, Agent, or Firm*—Frederick P. Weidner; Radford M. Reams

[57] ABSTRACT

A clamp has a first curved portion with one end connected to a second curved portion which overlaps or surrounds a segment of the first curved portion including the free end thereof. The free end of the second curved portion is connected to an extension, which has an elongated slot adjacent its end and an inclined lower surface adjacent its end. A base extends from one of the first and second curved portions in substantially the same direction as the extension and has an inclined upper surface at its end for cooperation with the inclined lower surface of the extension. The base has an opening extending therethrough to receive a screw, which passes through the slot in the extension prior to passing through the opening in the base. As the screw is advanced into a support structure engaging the lower surface of the base, the lower inclined surface of the extension moves relative to the upper inclined surface of the base to cause each of the first and second curved portions to have a smaller curvature whereby the first curved portion, which is the smaller of the two curved portions, is clamped against an article to be held. The outer surface of the first curved portion and the inner surface of the second curved portion have cooperating means to prevent lateral pull out. The inner surface of the first curved portion has article engaging elements.

14 Claims, 5 Drawing Figures

SELF-TIGHTENING CLAMP

BACKGROUND AND SUMMARY OF THE INVENTION

In the installation of various longitudinal articles such as wire harnesses and tubing in a refrigerator cabinet, for example, it is desired that such articles be rigidly secured and supported at various positions along their lengths to protect them from damage. It is desired that the articles be clamped as easily and quickly as possible to reduce assembly costs. At the same time, it is preferable that the clamping of an article not require judgment by the installer as to whether the clamp has engaged the article with sufficient tightness to retain the article in the desired position.

The clamp, which fits over the article at the position to which it is to be secured, must be capable of easily receiving the article. The clamp also must not allow the article to be easily removed therefrom after the clamp is installed thereon and prior to the clamp being attached at the desired position to rigidly secure and support the article. Otherwise, the time for assembly is increased.

The clamp of the present invention satisfactorily meets the foregoing requirements through being capable of engaging the article to retain it in position by merely advancing the mounting screw for the clamp into the support structure. When the clamp has securely engaged the article, further advancement of the mounting screw into the support structure is prevented.

By utilizing a pair of curved or arcuate portions, which are preferably segments of circles with the outer curved portion overlapping the inner curved portion, the clamp may easily receive the article to be clamped therebetween through passing the article between the two curved or arcuate portions. Once the article is disposed between the pair of curved or arcuate portions, it cannot be accidentally removed therefrom.

By the use of a single screw and a unique relation of the elements of the clamp receiving the mounting screw, the inner and outer curved portions have their radii or curvatures reduced as the mounting screw is advanced into the support structure to which it is to be secured. Thus, when further reduction in the radii or curvatures of the inner and outer curved portions of the clamp cannot be produced because of the article being tightly engaged by the inner curved portion, the mounting screw can no longer be advanced into the support structure. Therefore, no judgment by the installer is required other than to stop turning the mounting screw when it is no longer possible to turn the mounting screw. This insures that the clamp has tightly engaged the article to rigidly secure and support the article at the desired position.

An object of this invention is to provide a unique self-tightening clamp.

Another object of this invention is to provide a clamp that tightens itself as a mounting screw, which secures the clamp to a support structure, is driven into the support structure.

Other objects of this invention will be readily perceived from the following description, claims, and drawing.

This invention relates to a clamp including a first curved portion and a second curved portion. The second curved portion has one end connected to one end of the first curved portion and overlapping a portion of the first curved portion including the free end of the first curved portion. A base is connected to at least one of the first and second curved portions with extension means connected to the second curved portion and spaced from the base. The extension means extends from the second curved portion in substantially the same direction as the base. The clamp has means to reduce the distance of the extension means from the base to reduce the curvatures of the first and second curved portions to cause at least the first curved portion to engage an article to be clamped.

BRIEF DESCRIPTION OF THE DRAWINGS

The attached drawing illustrates a preferred embodiment of the invention, in which.

DESCRIPTION OF THE PREFERRED EMBODIMENT

Figure 1:
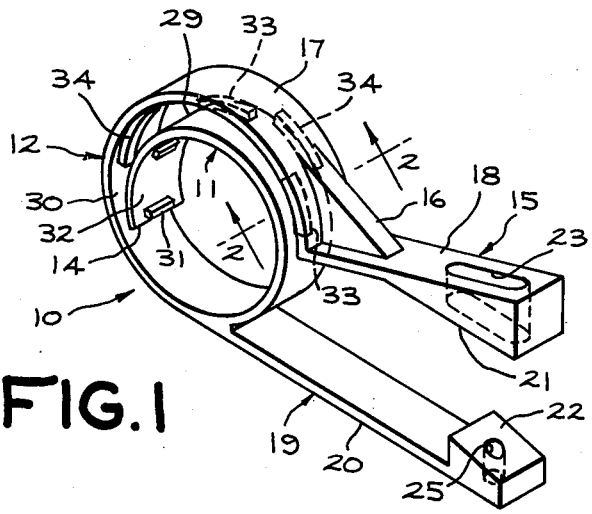
FIG. 1 is a perspective view of the clamp of the present invention in its non-clamping position.
Figure 2:
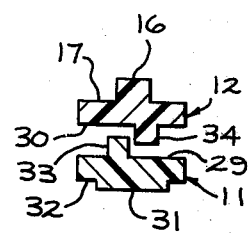
FIG. 2 is a fragmentary sectional view of a portion of the clamp of FIG. 1 and taken along line 2—2 of FIG. 1.
Figure 4:
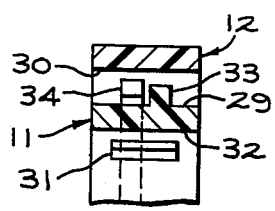
FIG. 4 is a fragmentary sectional view of a portion of the clamp and taken along line 4—4 of FIG. 3.

Referring to the drawing and particularly FIG. 1, there is shown a clamp 10 having a first or inner curved portion 11, which is perferably a segment of a circle, and a second or outer curved portion 12, which also is preferably a segment of a circle. The first curved portion 11 has a smaller radius or curvature than the second curved portion 12.

The first curved portion 11 has its free end 14 overlaped by the second curved portion 12. The second curved portion 12 has an extension 15 connected to its free end. The extension 15 extends away from each of the first curved portion 11 and the second curved portion 12.

A triangularly shaped web 16 extends between outer surface 17 of the second curved portion 12 and upper surface 18 of the extension 15. The web 16 reinforces both the extension 15 and the second curved portion 12.

The clamp 10 has a base 19 secured to the second curved portion 12 adjacent the connection of the second curved portion 12 to the first curved portion 11. The first curved portion 11 ends at approximately the four thirty o'clock position in FIG. 3 although it could extend to the six o'clock position in FIG. 3 whereby the base 19 would be connected to the first curved portion 11 rather than the second curved portion 12. The base 19 has its lower surface 20 substantially tangential to the outer surface 17 of the second curved portion 12 at the six o'clock position.

The extension 15 has an inclined lower surface 21 at its free or outer end. The lower inclined surface 21 is at the same angle as an upper inclined surface 22 of the base 19 at the free or outer end of the base 19. Thus, the inclined surface 21 can easily slide relative to the inclined surface 22.

The extension 15 has an elongated slot 23, which extends in substantially the same direction as the longitudinal axis of the extension 15, formed therein and extending from the upper surface 18 to the inclined lower surface 21. The slot 23 is capable of receiving a fastening means such as screw 24 (see FIGS. 3 and 5), which extends through the slot 23 into an opening 25 extending from the upper inclined surface 22 of the base 19 to the lower surface 20. The screw 24 extends through the opening 25 into a threaded hole 26 in a support structure such as a household refrigerator cabinet 27, for example.

Accordingly, when the screw 24 is advanced through the opening 20 in the base 19 into the threaded hole 26 of the cabinet 27, the lower inclined surface 21 of the extension member 15 moves down along the inclined upper surface 22 of the base 19. As a result, each of the first curved portion 11 and the second curved portion 12 is drawn towards the right (as viewed in FIGS. 3 and 5) along a plane defined by the inclined surfaces 21 and 22 so that the curvature of the first curved portion 11 and the curvature of the second curved portion 12 are reduced.

As a result, the first curved portion 11 clamps against an article 28, which is disposed within the first curved portion 11 by being passed between outer surface 29 of the first curved portion 11 and inner surface 30 of the second curved portion 12 through spreading the second curved portion 12 from the first curved portion 11. The first curved portion 11 has article-engaging projections 31 at spaced arcuate intervals on its inner surface 32 which engage the article 28 to clamp the article 28 in position. It should be understood that the projections 31 can be omitted if desired.

To prevent lateral pull-out of either of the first curved portion 11 and the second curved portion 12 with respect to the other, the first curved portion 11 has two lugs 33 projecting from its outer surface 29 at a spaced arcuate interval. The second curved portion 12 has two lugs 34 on its inner surface 30 at a spaced arcuate interval. The lugs 33 and 34 cooperate with each other to prevent lateral pull out. The lugs 33 are not disposed in circumferential alignment with each other, and the lugs 34 are not disposed in circumferential alignment with each other. However, the adjacent of the lugs 33 and 34 are circumferentially aligned with each other, and the other of the lugs 33 and 34 are circumferentially aligned with each other.

Considering the utilization of the clamp 10 with the article 28, the extension 15 and the base 19 are disposed so that the article 28 is therebetween as the clamp 10 is advanced relative to the article 28. Then, the inner curved surface 30 of the second curved portion 12 is pulled away from the outer curved surface 29 of the first curved portion 11 through moving the extension 15 away from the base 19 so that the article 28 can be advanced between the outer curved surface 29 of the first curved portion 11 and the inner curved surface 30 of the second curved portion 12 until the article 28 has been advanced past the free end 14 of the first curved portion 11.

Figure 3:
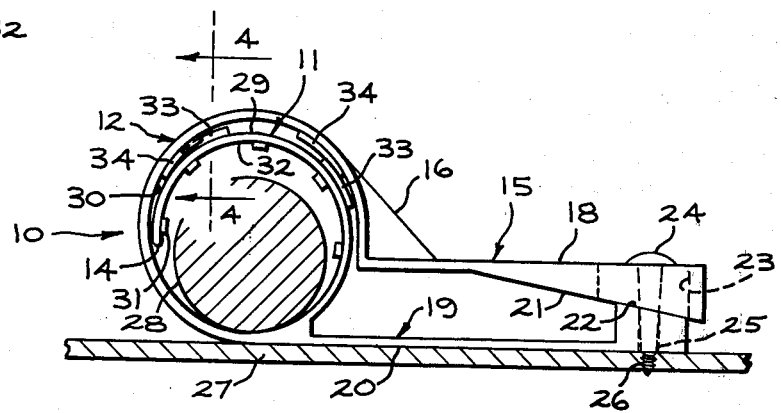
FIG. 3 is an end elevational view of the clamp of FIG. 1 and showing it prior to clamping an article but being mounted on a support structure.

With the article 28 within the first curved portion 11 and also surrounded by a portion of the second curved portion 12, the article 28 cannot be accidentally removed from the clamp 10. Then, the lower surface 20 of the base 19 is moved against the refrigerator cabinet 27 as shown in FIG. 3.

Figure 5:
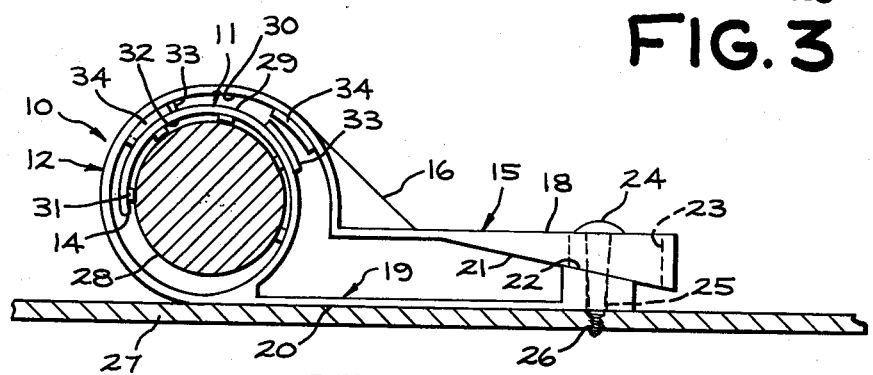
FIG. 5 is an end elevational view, similar to FIG. 3, of the clamp of FIG. 1 and showing an article being clamped.

The lower inclined surface 21 of the extension 15 is next placed against the upper inclined surface 22 of the base 19 and the mounting screw 24 is passed through the elongated slot 23 in the extension 15 and the opening 25 in the base 19 into the threaded hole 26 in the refrigerator cabinet 27. As the screw 24 is advanced into the cabinet 27, the extension 15 is pulled to the right along the upper inclined surface 22 of the base 19 by the lower inclined surface 21 of the extension 15 sliding therealong. This draws both the first curved portion 11 and the second curved portion 12 along the plane defined by the inclined surfaces 21 and 22. As a result, the radii or curvatures of the first curved portion 11 and the second curved portion 12 are reduced as shown in FIG. 5.

When the article 28 is fully engaged by the projections 31 of the first curved portion 11, the inclined surface 21 of the extension 15 is no longer capable of being moved along the upper inclined surface 22 of the base 19. Thus, the screw 24 cannot be advanced further into the threaded hole 26 in the cabinet 27 because the upper surface 18 of the extension 15 cannot be moved closer to the cabinet 27. Therefore, the article 28 is rigidly secured and supported by the clamp 10.

During this movement of the base 15 by advancement of the mounting screw 24, the centers of the first curved portion 11 and the second curved portion 12, if they are segments of circles, also move from the initial position. This movement is substantially along the plane defined by the inclined surfaces 21 and 22.

While the present invention has shown and described the first curved portion 11 and the second curved portion 12 as preferably being segments of circles, it should be understood that the forces exerted on the first curved portion 11 and the second curved portion 12 in cooperation with the article 28 by the advancement of the mounting screw 24 may result in either or both of the first curved portion 11 and the second curved portion 12 being other than segments of circles when the article 28 is clamped by the clamp 10. Additionally, the article-engaging surfaces of the portions 11 and 12 may have any shapes desired.

The clamp 10 is formed of any suitable material capable of being flexible and yet retaining its original shape. One suitable example of the material of the clamp 10 is acetal resin.

While the present invention has shown and described the clamp 10 as being secured to the refrigerator cabinet 27 for rigidly securing and supporting the article 28 at a desired position along its length, it should be understood that the clamp 10 could be utilized for clamping two separate articles in overlapping relation to each other. Furthermore, when clamping two separate articles to each other, it is not necessary for the clamp 10 to be secured to a support structure such as the refrigerator cabinet 27. Instead, the opening 25 in the base 19 could be threaded and the screw 24 merely advanced through the opening 25 to cause the clamp 10 to clamp the two articles to each other.

While the present invention has shown and described the clamp 10 as having the lugs 33 and 34 to prevent lateral pull out of either of the first curved portion 11 and the second curved portion 12 with respect to the other, it should be understood that the lugs 33 and 34 are not necessary in all situations. Thus, the lugs 33 and 34 could be omitted if desired.

While the extension 15 has been shown as being at the end of the second curved portion 12, it should be understood that such is not a requisite for satisfactory operation. The extension 15 could be disposed at other than the free end of the second curved portion 12.

An advantage of this invention is that the clamp is usable in a high speed assembly operation. Another advantage of this invention is that its dimensions may be altered to suit the requirement. A further advantage of this invention is that it provides a smooth assembly operation for securing an article at a position along the length of the article. Still another advantage of this invention is that it avoids any lateral pull out. A still further advantage of this invention is that it enables easy installation.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A clamp including a first curved portion, a second curved portion, said second curved portion having one end connected to one end of said first curved portion so that said first curved portion and said second curved portion form a continuous, uninterrupted curved surface, said second curved portion overlapping a portion of said first curved portion including the free end of said first curved portion, a base connected to at least one of said first curved portion and said second curved portion, extension means connected to said second curved portion and spaced from said base, said extension means extending from said second curved portion in substantially the same direction as said base, means to reduce the distance of said extension means from said base to reduce the curvatures of said first curved portion and said second curved portion to cause at least said first curved portion to engage an article to be clamped, and each of said base and said extension means having cooperating means engaging each other to cause movement of said extension means relative to said base when said reducing means is effective.

2. The clamp according to claim 1 in which said cooperating means of said base comprises an inclined surface on said base, said cooperating means of said extension means comprises an inclined surface on said extension means, and said inclined surfaces of said base and said extension means engage each other.

3. The clamp according to claim 2 in which said reducing means includes a fastener, said inclined surface of said base has an opening to receive said fastener for passage therethrough for attachment to a support structure, said inclined surface of said extension means has an elongated slot with its elongation extending in a direction substantially parallel to said extension means so that said inclined surface of said extension means can move relative to said fastener along said inclined surface of said base, and said elongated slot has said fastener passing therethrough prior to said fastener passing through said opening in said base.

4. The clamp according to claim 3 in which said first curved portion initially is a segment of a circle and said second curved portion initially is a segment of a circle having a larger radius than the circle having its segment form said first curved portion, the center of each of the circles moving substantially along a plane defined by said inclined surface of said extension means and said inclined surface of said base when said fastener causes movement of said extension means.

5. The clamp according to claim 3 in which said first curved portion initially is a segment of a circle and said second curved portion initially is a segment of a circle having a larger radius than the circle having its segment form said first curved portion.

6. The clamp according to claim 1 in which each of said first curved portion and said second curved portion has means engaging with each other to prevent lateral movement between said first curved portion and said second curved portion, said engaging means having no portion protruding inwardly of said first curved portion.

7. The clamp according to claim 6 in which said engaging means of said first curved portion is on the outer surface of said first curved portion and said engaging means of said second curved portion is on the inner surface of said second curved portion.

8. The clamp according to claim 1 in which said first curved portion initially is a segment of a circle and said second curved portion initially is a segment of a circle having a larger radius than the circle having its segment form said first curved portion, the center of each of the circles moving when said reducing means reduces the distance of said extension means from said base.

9. The clamp according to claim 1 in which said base has at least one surface substantially tangential to at least one of said first curved portion and said second curved portion, said extension means has a surface substantially parallel to said substantially tangential surface of said base, and said reducing means reduces the distance of said substantially parallel surface of said extension means from said substantially tangential surface of said base.

10. The clamp according to claim 1 in which said first curved portion extends for at least 180°, said second curved portion extends for greater than 180°, and said second curved portion overlaps said first curved portion for at least 180° when the clamp is effective.

11. The clamp according to claim 1 in which said second curved portion overlaps a portion of said first curved portion including the free end of said first curved portion at all times and each of said first curved portion and said second curved portion is formed prior to receiving an article to be clamped.

12. The clamp according to claim 1 in which the center of curvature of each of said first curved portion and said second curved portion moves in substantially the same direction in which said base and said extension means extend when said reducing means reduces the curvatures of said first curved portion and said second curved portion.

13. A clamp including a first curved portion, a second curved portion, said second curved portion having one end connected to one end of said first curved portion so that said first curved portion and said second curved portion form a continuous, uninterrupted curved surface, said second curved portion overlapping a portion of said first curved portion including the free end of said first curved portion, a base connected to at least one of said first curved portion and said second curved portion, extension means connected to said second curved portion and spaced from said base, said extension means extending from said second curved portion in substantially the same direction as said base, means to reduce the distance of said extension means from said base to reduce the curvatures of said first curved portion and said second curved portion to cause at least said first curved portion to engage an article to be clamped and at least one of said base and said extension means having means to cause movement of said extension means relative to said base in a direction away from the free end of said first curved portion when said reducing means is effective.

14. A clamp including a first curved portion, a second curved portion, said second curved portion having one end connected to one end of said first curved portion and overlapping a portion of said first curved portion including the free end of said first curved portion, a base connected to at least one of said first curved portion and said second curved portion, extension means connected to said second curved portion and spaced from said base, said extension means extending from said second curved portion in substantially the same direction as said base, means to reduce the distance of said extension means from said base to reduce the curvatures of said first curved portion and said second curved portion to cause at least said first curved portion to engage an article to be clamped, each of said base and said extension means has cooperating means to cause movement of said extension means relative to said base when said reducing means is effective, said cooperating means of said base comprises an inclined surface on said base, said cooperating means of said extension means comprises an inclined surface on said extension means, said inclined surfaces of said base and said extension means engage each other, said reducing means includes a fastener, said inclined surface of said base has an opening to receive said fastener for passage therethrough for attachment to a support structure, said inclined surface of said extension means has an elongated slot with its elongation extending in a direction substantially parallel to said extension means so that said inclined surface of said extension means can move relative to said fastener along said inclined surface of said base, said elongated slot has said fastener passing therethrough prior to said fastener passing through said opening in said base, each of said first curved portion and said second curved portion has means engaging with each other to prevent lateral movement between said first curved portion and said second curved portion, said engaging means of said first curved portion is on the outer surface of said first curved portion and said engaging means of said second curved portion is on the inner surface of said second curved portion, said engaging means of said first curved portion comprises at least two arcuately spaced lugs, said engaging means of said second curved portion comprises at least two arcuately spaced lugs, and at least one of said lugs of said first curved portion is always disposed for engagement with one of said lugs of said second curved portion to prevent lateral movement between said first curved portion and said second curved portion.

* * * * *